United States Patent
Weinstein et al.

(10) Patent No.: US 9,197,512 B2
(45) Date of Patent: Nov. 24, 2015

(54) OPTIMIZING CONTENT PRODUCTION BASED UPON DISTRIBUTION CHANNEL METRICS

(71) Applicant: Wetpaint.com, Inc., Seattle, WA (US)

(72) Inventors: Alex David Weinstein, Bellevue, WA (US); Bo Steven Finneman, Los Angeles, CA (US); Dmitry Frenkel, Bothell, WA (US)

(73) Assignee: Wetpaint.com, Inc., Seattle, WA (US)

( * ) Notice: Subject to any disclaimer, the term of this patent is extended or adjusted under 35 U.S.C. 154(b) by 0 days.

(21) Appl. No.: 13/759,562

(22) Filed: Feb. 5, 2013

(65) Prior Publication Data

US 2013/0219282 A1    Aug. 22, 2013

Related U.S. Application Data

(60) Provisional application No. 61/600,345, filed on Feb. 17, 2012.

(51) Int. Cl.
| | | |
|---|---|---|
| *G06F 3/00* | (2006.01) | |
| *H04L 12/24* | (2006.01) | |
| *G06Q 30/02* | (2012.01) | |

(52) U.S. Cl.
CPC ............ *H04L 41/22* (2013.01); *G06Q 30/0241* (2013.01); *H04L 41/5045* (2013.01); *H04L 41/5064* (2013.01)

(58) Field of Classification Search
None
See application file for complete search history.

(56) References Cited

U.S. PATENT DOCUMENTS

| | | | |
|---|---|---|---|
| 7,660,869 B1 * | 2/2010 | Kitts | 709/217 |
| 8,112,312 B2 | 2/2012 | Ritter | |
| 8,365,062 B2 * | 1/2013 | Seolas et al. | 715/206 |
| 2003/0120641 A1 | 6/2003 | Pelletier | |
| 2003/0158780 A1 | 8/2003 | Isobe et al. | |

(Continued)

FOREIGN PATENT DOCUMENTS

| | | |
|---|---|---|
| KR | 10-2001-0074279 A | 8/2001 |
| KR | 10-2009-0002017 A | 1/2009 |
| KR | 10-2011-0092641 A | 8/2011 |

OTHER PUBLICATIONS van Belle, Gerald; Statistical Rules of Thumb, Second Edition, Chapter 2: Sample Size; Wiley Series in Probability and Statistics; John Wiley & Sons, Published Sep. 2, 2008; Accessed Feb. 5, 2013 at http://www.vanbelle.org/chapters/webchapter2.pdf.

(Continued)

*Primary Examiner* — Anil N Kumar
(74) *Attorney, Agent, or Firm* — John W. Branch; Lowe Graham Jones PLLC

(57) ABSTRACT

Embodiments are directed towards determining an overall success of a plurality of features and recommending a subset of those features to a user for generating new content. For each feature that is associated with content, an overall success may be determined based on a success of each of a plurality of content that the feature is associated. A subset of the features may be displayed to the user—from which the user can select features to utilize for generating the new content. Based on the features selected by the user, the displayed features may be dynamically updated to include one or more recommended features. A feature may be recommended to the user based on a combination of the overall success of each selected feature and the overall success of each recommended feature. The selected features may be utilized to create the new content.

24 Claims, 9 Drawing Sheets

(56) References Cited

U.S. PATENT DOCUMENTS

| | | | |
|---|---|---|---|
| 2005/0028188 A1 | 2/2005 | Latona et al. | |
| 2005/0159921 A1 | 7/2005 | Louviere et al. | |
| 2008/0077955 A1 | 3/2008 | Haberman | |
| 2008/0091516 A1 | 4/2008 | Giunta | |
| 2008/0201225 A1* | 8/2008 | Maharajh et al. | 705/14 |
| 2008/0209343 A1* | 8/2008 | Macadaan et al. | 715/747 |
| 2009/0132435 A1 | 5/2009 | Titus et al. | |
| 2009/0158179 A1* | 6/2009 | Brooks | 715/762 |
| 2009/0163183 A1 | 6/2009 | O'Donoghue et al. | |
| 2009/0210899 A1 | 8/2009 | Lawrence-Apfelbaum et al. | |
| 2010/0174671 A1 | 7/2010 | Brooks et al. | |
| 2010/0251304 A1* | 9/2010 | Donoghue et al. | 725/46 |
| 2012/0072291 A1 | 3/2012 | Bharat | |
| 2013/0123020 A1 | 5/2013 | Weinstein et al. | |
| 2013/0124634 A1 | 5/2013 | Weinstein et al. | |

OTHER PUBLICATIONS

University of Regina; Table of t Distribution; Copyright 2012; Accessed Feb. 5, 2013 at http://uregina.ca/~gingrich/tt.pdf.

International Search Report and Written Opinion for PCT/US2012/064390, mailed Mar. 19, 2013.

Official Communication in U.S. Appl. No. 13/708,566, mailed Apr. 8, 2013.

Official Communication in U.S. Appl. No. 13/673,102, mailed Apr. 8, 2013.

International Search Report and Written Opinion in International Application No. PCT/US2013/024922 mailed May 30, 2013.

Li et al., "Internet Advertising Formats and Effectiveness," Oct. 2004, pp. 1-31.

Official Communication for U.S. Appl. No. 13/708,566 mailed Sep. 27, 2013.

Official Communication for U.S. Appl. No. 13/797,452 mailed Dec. 20, 2013.

Official Communication for U.S. Appl. No. 13/797,452 mailed Jul. 22, 2013.

Official Communication for U.S. Appl. No. 13/673,102 mailed Sep. 16, 2013.

Official Communication for U.S. Appl. No. 13/708,566 mailed Dec. 30, 2013.

* cited by examiner

OPTIMIZING CONTENT PRODUCTION BASED UPON DISTRIBUTION CHANNEL METRICS

CROSS REFERENCE TO RELATED APPLICATIONS

This non-provisional patent application claims the benefit under 35 U.S.C. §119(e) of U.S. Provisional Patent Application Ser. No. 61/600,345 filed on Feb. 17, 2012, entitled "Optimizing Content Production Based Upon Distribution Channel Metrics," which is incorporated herein by reference.

TECHNICAL FIELD

The present invention relates generally to content management, and more particularly, but not exclusively, to optimizing content production by determining and dynamically displaying recommended features to employ with the content.

BACKGROUND

The business model of the publishing industry has remained relatively stable throughout, the majority of the 20$^{th}$ century. Content providers typically utilized a model that can be best described as "high-quality journalistic art," where a group of talented writers and editors Immerse themselves in topical areas that are of interest to the targeted demographic. They then create content that fits within the general boundaries defined by the interests of the target audience. Essentially, high-end journalism has been an art form and few science-backed constraints or recommendations have been imposed on the publishing process. With the introduction of the Internet, content has become largely digitized and distribution mechanisms have changed generally resulting in problems to the content providers to efficiently capitalize on Internet-driven media and continually changing audiences. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
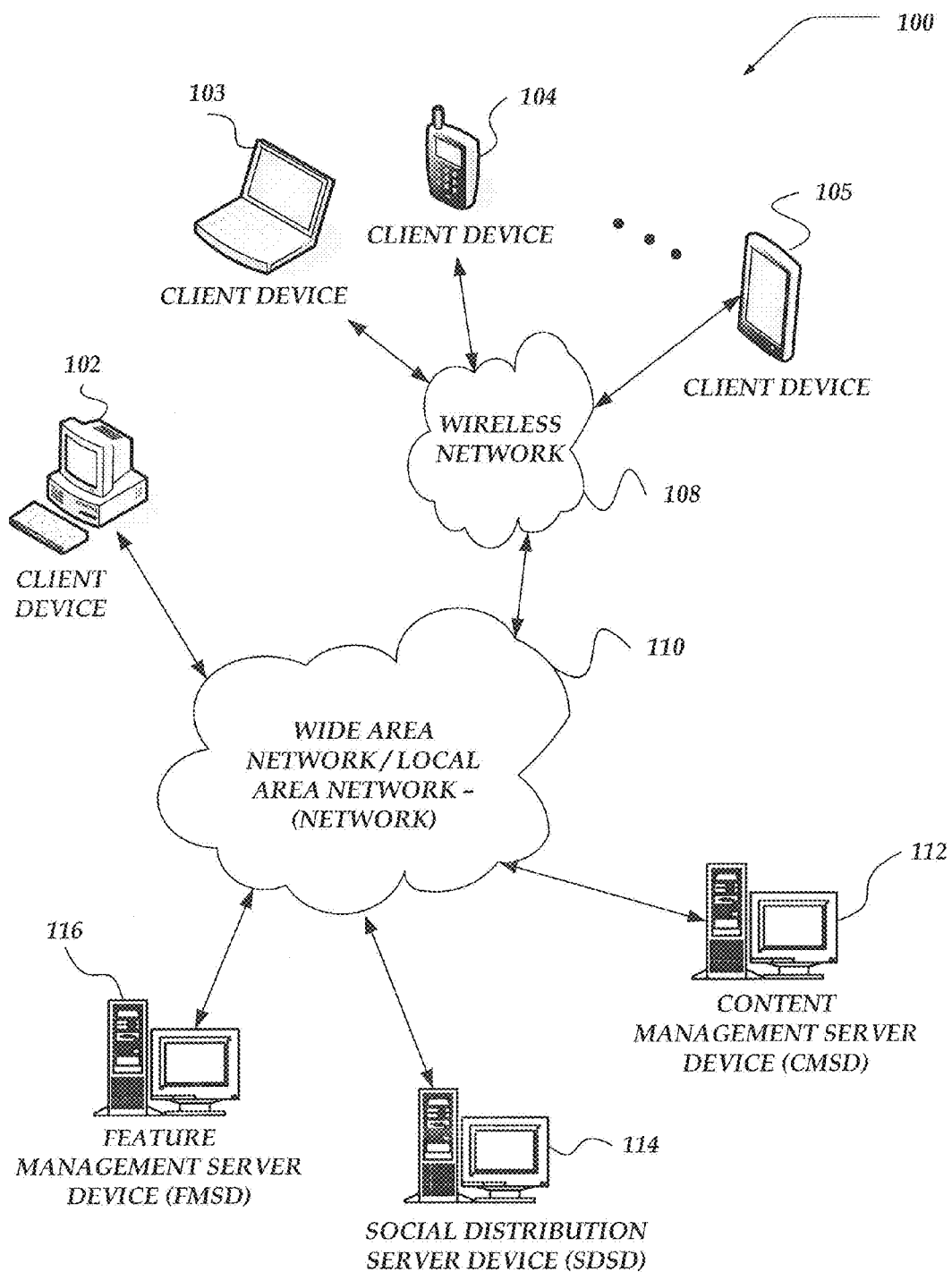
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to digital data that may be communicated over a network to be remotely displayed by a computing device. Non-exhaustive examples of content include but are not limited to articles, blogs, movies, videos, music, sounds, pictures, illustrations, graphics, images, text, or the like. Content may also include summaries, briefs, snippets, headlines, or the like, of the content. In at least one embodiment, content may also include links, hyperlinks, or the like, to additional content. For example, a piece of content may be a post to a social media page, where the post includes a heading and a link to an article.

In some embodiments, each piece of content may include one or more features of the content. These features may include, for example, a subject, topic, theme, type of content, content form (e.g., news report, investigation report, breaking news report, editorial piece, opinion piece, or the like) trend, character, person, keyword, date of creation, author, publisher/poster, or the like. Features may also include content structure indicators, such as, for example, presence and/or number of questions directed at the audience, presence and/or number of emotional statements, headline form (e.g., statement, question, emotional statement, or the like), or the like. In at least one of various embodiments, the features of a piece of content may also include traffic achieved for the content on a channel (i.e., a channel that the content is posted/provided), which may include statistics and other information about the content, such as, for example, amount of editing time, publication date and/or time, time a visitor accesses the content, number of online "hits" that he content receives (e.g., number of clicks, click rate, or the like), virality (e.g., number of shares), engagement of users (e.g., number of comments), exit rate from page, or the like.

Features may also include an aspect, characteristic, and/or substance of a piece of content that can be modified. In at least one embodiment, features may indicate how the content should be displayed to a user. For example, in some embodiments, the feature may indicate a format of the content, such as, for example, font color, font size, capitalization utilization, image size, image quality, or the like. However, in other embodiments, the features may indicate whether or not to include an image, whether an audience poll is including with the content, whether the content should be provided in the form of a question, or the like. In another embodiment, the features may indicate a keyword to include with the content, such as, for example, "breaking news," "just in," or the like. These keywords may also include a name associated with the content, such as person discussed in the content, a show/episode title, article title, or the like.

As used herein, the terms "success" and/or "overall success" may refer to a metric and/or value that indicates how successful a piece of content and/or feature is for a given objective function. The objective function may be a test for determining how well content performs based on monitored actions associated with the content. These actions may include, but are not limited to, a number of user clicks, a number of times users' share the content, a number of user comments, a time accessing the content and/or the containing channel, revenue obtained from advertising associated with the content (e.g., advertisements shown alongside the content), revenue obtained directly from the user, or the like. In at least one embodiment, the actions may be monitored and/or collected for a given period of time.

As used herein, the term "channel" refers to a method of providing and/or otherwise distributing content from a publisher to a user. Channels may include, but are not limited to, email messages, text messages, web pages, social media pages, social media messages, physical medium including mailings, billboard displays, television, telephone calls, or the like. Non-limiting, non-exhaustive examples of providing content to a user through a channel may include posting content or a link to content on a social, media page, sending an email with content to a user, or the like. In some embodiments, users may subscribe to a channel by requesting content from a publisher through a channel, by signing up with a channel (e.g., signing up with an email distribution list), becoming a member of the channel (e.g., becoming a member of the publisher's social media page), or the like. Subscribing to a channel may be free or may include a monetary cost, which may be charged to a user and/or offset by advertising. In some embodiments, content may be posted and/or otherwise provided to a channel for one or more users. In other embodiments, content may be provided through a channel to one or more users.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to determining an overall success of a plurality of features and recommending a subset of those features to a user for use in generating new content and/or editing existing content. In some embodiments, a success of each of a plurality of content may be determined for at least one channel. Each of the plurality of content may include one or more associated features. For each feature, an overall success may be determined based on the success of each content that the feature is associated with. In some embodiments, each feature may include an overall success of the feature for a plurality of different channels and/or for different groups of channels. In other embodiments, features may include a plurality of overall successes for different relationships with other features. In at least one embodiments, these feature relationships may include those features that were associated with a same published content on the at least one channel.

A user may utilize a graphical user interface to generate new content for publication on at least one of the plurality of channels. The interface may display a subset of the plurality features to the user. The user may be enabled to select one or more of the features. Based on the features selected by the user, the displayed features may be dynamically updated to include at least one recommended feature to the user. In some embodiments, a feature may be recommended based on the overall success of each selected feature and the overall success of each of at least one unselected feature. In at least one of various embodiments, a recommendation for at least one unselected feature may be determined based on the overall success of the at least one selected feature along with the at least one recommended feature for published content on the at least one channel. The user may be enabled to select at least one of the recommended features, which may update the displayed features to include yet another set of recommended features. The user may be enabled to employ the selected features to generate the new content for publication. Additionally, in other embodiments, the interlace may display a score of the selected features, which may be dynamically updated in real time as the user selects additional features.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, Content Management Server Device (CMSD) 112, Social Distribution Server Device (SDSD) 114, and Feature Management Server Device (FMSD) 116.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the Like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet, computers 105, and the like. However, portable computing devices are not so limited and may also include other portable devices such as cellular telephones, display pagers, radio frequency (RF) devices, infrared (IR) devices. Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), Hypertext Markup Language (HTML), extensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send, receive, and/or otherwise access content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, SDSD 114, or other computing devices.

Client devices 102-105 may further be configured to include a client application that enables an end-user to log into an end-user account that may be managed by another computing device, such as SDSD 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, CMSD 112, SDSD 114, FMSD 116, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of CMSD 112 is described in more detail below in conjunction with FIG. 3. Briefly, however. CMSD 112 includes virtually any network device capable of managing a plurality of content. In some embodiments, CMSD 112 may manage and/or store which channel(s) the content has been provided/published. In other embodiments, CMSD 112 may monitor and/or collect actions provided by users on the content, such as a number of clicks, user comments, or the like. In some embodiments, CMSD 112 may be enabled to analyze the monitored actions to determine one or more successes and/or metrics associated with the content for an objective function. CMSD 112 may store the determined successes and/or metrics for the content. Examples of successes may include, but is not limited to, a number of times the content was accessed by a user, how long a user accessed the content, whether a user shared the content, features of the content, comments and/or posts provided by users about the content, or the like.

Devices that may be arranged to operate as CMSD 112 include various network devices, including, but not limited to personal computers, desktop computers, multiprocessor systems, microprocessor-based or programmable consumer electronics, network PCs, server devices, network appliances, and the like.

Although FIG. 1 illustrates CMSD 112 as a single computing device, the invention is not so limited. For example, one or more functions of the CMSD 112 may be distributed across one or more distinct network devices. Moreover, CMSD 112 is not limited to a particular configuration. Thus, in one embodiment, CMSD 112 may contain a plurality of network devices. In another embodiment, CMSD 112 may contain a plurality of network devices that operate using a master/slave approach, where one of the plurality of network devices of CMSD 112 operates to manage and/or otherwise coordinate operations of the other network devices. In other embodiments, the CMSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of SDSD 114 is described in more detail below in conjunction with FIG. 3. Briefly, however, SDSD 114 includes virtually any network device capable of enabling a user to view and select recommended features for generating new content. SDSD 114 may be enabled to communicate with FMSD 116 and/or CMSD 112. In at least one embodiment, SDSD 114 may receive one or more features and/or recommended features front FMSD 116 to display to a user.

Devices that may be arranged to operate as SDSD 114 include various network devices, including, but not limited to personal computers, desktop computers, multiprocessor systems, microprocessor-based or programmable consumer electronics, network PCs, server devices, network appliances, and the like.

Although FIG. 1 illustrates SDSD 114 as a single computing device, the invention is not so limited. For example, one or more functions of the SDSD 114 may be distributed across one or more distinct network devices. Moreover, SDSD 114 is not limited to a particular configuration. Thus, in one embodiment, SDSD 114 may contain a plurality of network devices. In another embodiment, SDSD 114 may contain a plurality of network devices that operate using a master/slave approach, where one of the plurality of network devices of SDSD 114 operates to manage and/or otherwise coordinate operations of the other network devices. In other embodiments, the SDSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of FMSD 116 is described in more detail below in conjunction with FIG. 3. Briefly, however, FMSD 116 includes virtually any network device capable of managing and/or storing a plurality of features and at least one corresponding success of each feature. In some embodiments, FMSD 116 may maintain the content that is associated with the features. In other embodiments, FMSD 116 may maintain relationships of features that were associated with the same content. In some embodiments, CMSD 112 and FMSD 116 may communicate and interact to determine the successes of each feature.

Devices that may be arranged to operate as FMSD 116 include various network devices, including, but not limited to personal computers, desktop computers, multiprocessor systems, microprocessor-based or programmable consumer electronics, network PCs, server devices, network appliances, and the like.

Although FIG. 1 illustrates FMSD 116 as a single computing device, the invention is not so limited. For example, one or more functions of the FMSD 116 may be distributed across one or more distinct network devices. Moreover, FMSD 116 is not limited to a particular configuration. Thus, in one embodiment, FMSD 116 may contain a plurality of network devices. In another embodiment, FMSD 116 may contain a plurality of network devices that operate using a master/slave approach, where one of the plurality of network devices of FMSD 116 operates to manage and/or otherwise coordinate operations of the other network devices. In other embodiments, the FMSD 116 may operate as a plurality of network devices within a cluster architecture, a peer-to-peer architecture, and/or even within a cloud architecture. Thus, the invention is not to be construed as being limited to a single environment, and other configurations, and architectures are also envisaged.

Although illustrated separately, the functionality of CMSD 112, SDSD 114, and FMSD 116 may be performed by a single device, different devices, different combinations of devices, or the like.

Illustrative Client Device

Figure 2:
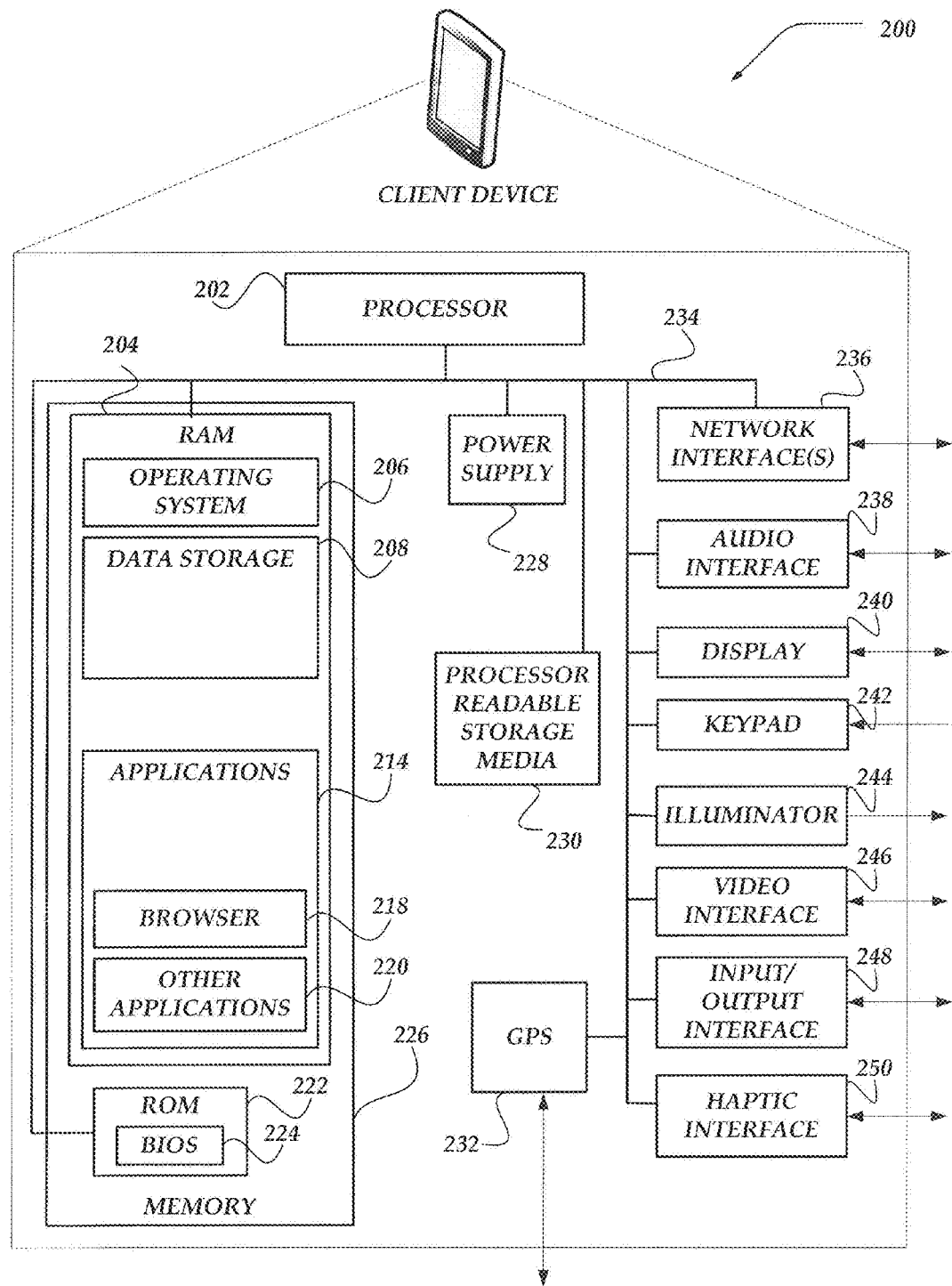
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interlace card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interlace 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, other content, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as CMSD 112, SDSD 114, and/or FMSD 116 of FIG. 1.

Illustrative Network Device

Figure 3:
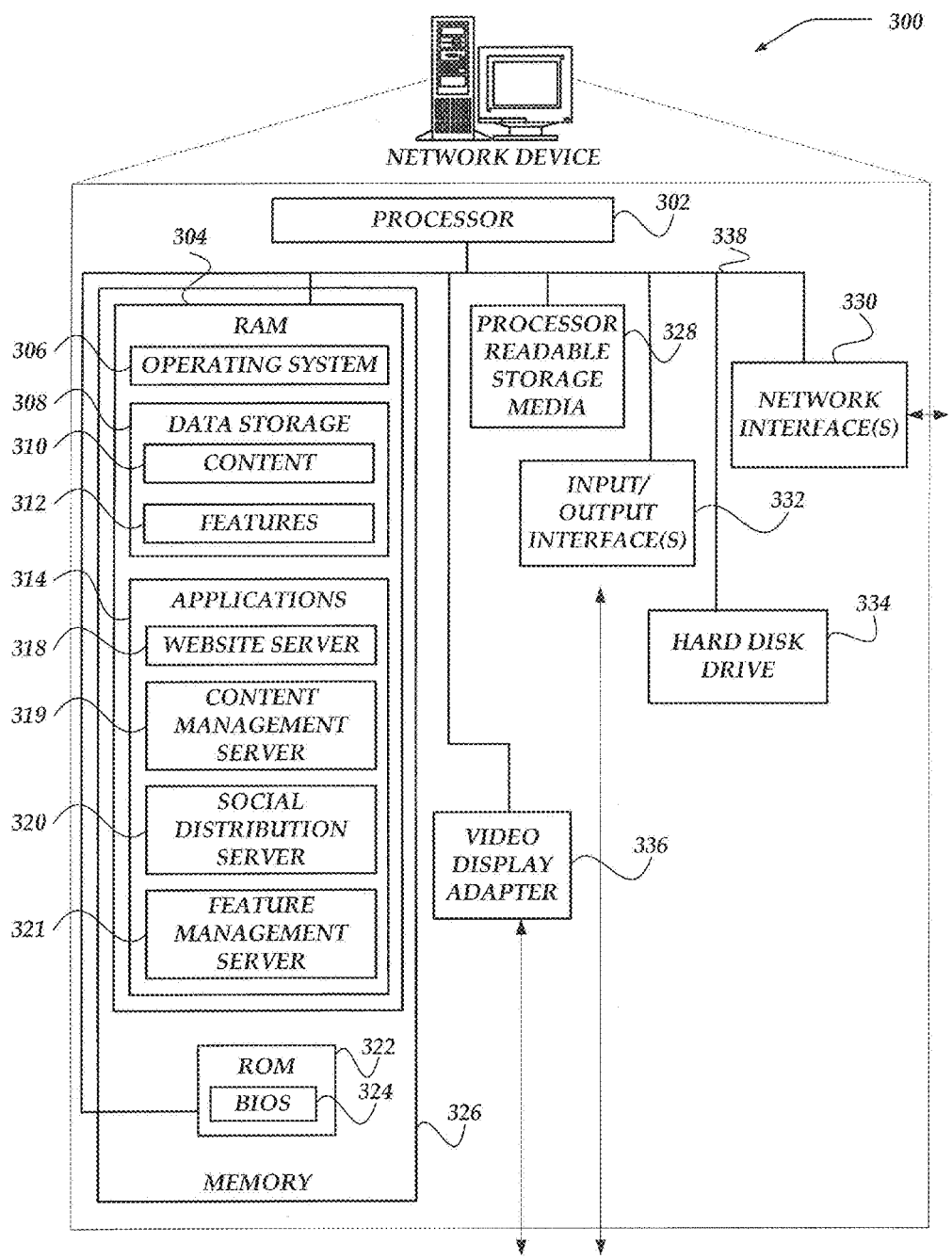
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example CMSD 112, SDSD 114, FMSD 116 of FIG. 1—a combination of those devices—and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network Interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, Infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and winch can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data store 308 may also include content 310 and features 312. Content 310 may include a plurality of pieces of content. In some embodiments, content 310 may include other data associated with each piece of content, such as, for example, a success of the content, history of actions performed by users on the content, features of the content, or the like. In at least one embodiment content may be associated with a unique identifier. In some embodiments, the unique identifier may be utilized to obtain and/or store actions associated with the content. Features 332 may include a plurality of features. Features 312 may include those features that are associated with at least one piece of content 310. In some embodiments, features 312 may include a success of each feature. In other embodiments, features 312 may include identifiers and/or relationships of other related features (e.g., those features that were associated with a same piece of content). In at least one embodiment, feature 312 may maintain a success of each of these feature relationships.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, Content Management Server (CMS) 319, Social Distribution Server (SDS) 320, and Feature Management Server (FMS) 321.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

CMS 319 may be configured to manage a plurality of content, such as content 310. In at least one embodiment CMS 319 may manage content as described above in conjunction with CMSD 112 of FIG. 1. In some embodiments, CMS 319 may be employed by CMSD 112 of FIG. 1. In any event, CMS 319 may employ processes, or parts of processes, similar to those described in conjunction with FIGS. 5-7, to perform at least some of its actions.

SDS 320 may be configured to enable a user to view and select features for generating new content, as described above in conjunction with SDSD 114 of FIG. 1. In some embodiments, SDS 320 may be employed by SDSD 114 of FIG. 1. In any event, SDS 320 may employ processes, or parts of processes, similar to those described in conjunction with FIGS. 5-7, to perform at least some of its actions.

FMS 321 may be configured to manage a plurality of features, such as features 312. In at least one embodiment, FMS 321 may manage features as described above in conjunction with FMSD 116 of FIG. 1. In some embodiments, FMS 321 may be employed by FMSD 116 of FIG. 1. In any event, FMS 321 may employ processes, or parts of processes, similar to those described in conjunction with FIGS. 5-7, to perform at least some of its actions.

Illustrative System

Figure 4:
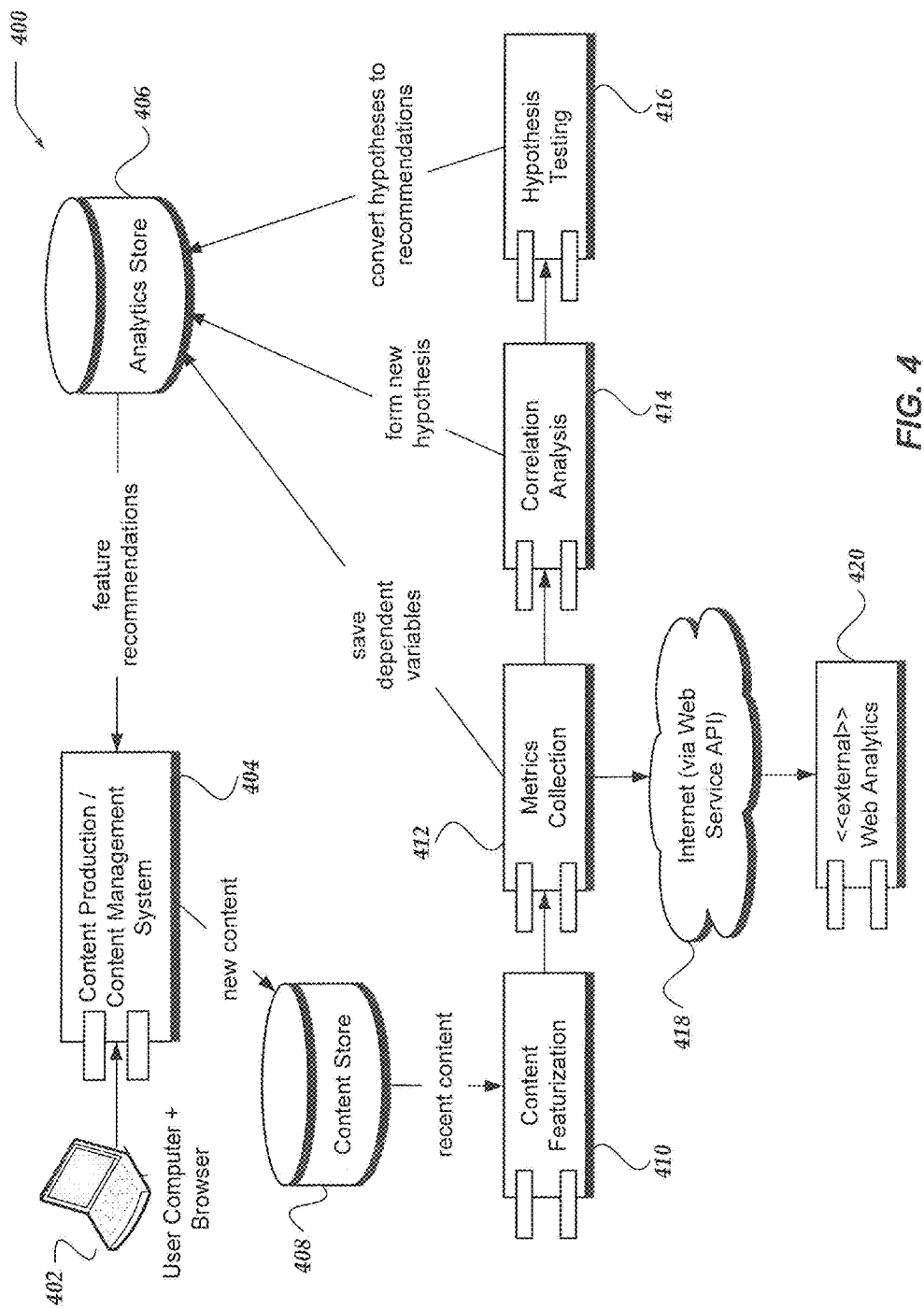
FIG. 4 shows an embodiment of a system diagram that may be employed to determine and dynamically recommend features to a user in accordance with at least one of the various embodiments.

FIG. 4 shows an embodiment of a system diagram that may be employed to determine and dynamically recommend features to a user in accordance with various embodiments. System 400 may include user computer 402, content production/content management system 404, analytics store 406, content store 408, content featurization 410, metrics collection 412, correlation analysis 414, hypothesis testing 416, internet 418, Web analytics 420.

User computer 402 may access content production/content management system 404 to enable a user to select features and/or to generate content. In at least one of various embodiments, user computer 402 may be an embodiment of client device 200 of FIG. 2.

Content production/content management system 404 may enable a content production/content management system of user computer 402 to view and select recommended features. In at least one embodiment, content production/content management system 404 may be in communication with analytics store 406 to determine which features to recommend to the user. In at least one of various embodiments, content production/content management system 404 may be an embodiment of at least a portion of network device 300 of FIG. 3.

Analytics store 406 may store a plurality of features and successes of those features. In at least one of various embodiments, analytics store 406 may be an embodiment of at least features 312 of FIG. 3.

Content store 408 may store and/or maintain content, including published and unpublished content. In some embodiments, content store 408 may receive new content generated by a user using content production/content management system 404. In at least one of various embodiments, content store 408 may be an embodiment of content 310 of FIG. 3.

Content featurization 410 may be enabled to determine the features associated with a piece of content. In at least one embodiment, a plurality of previously published content may be provided from content store 408 to content featurization 410. In some embodiments, the previously published content may be recent content, such as, but not limited to, content published in the last week, month, or the like. In some other embodiments, this content may also have been created by a different publisher.

Metrics collection 412 may be enabled to collect metrics (e.g., success) about each piece of content and determine a success of the content. Metrics collection 412 may be configured to communication with web analytics 420 through internet 418. In at least one of various embodiments, internet 418 may be an embodiment of networks 108 and/or 110 of FIG. 1. Web analytics 420 may be configured to collect actions of users that may be employed to determine the success of content. Metrics collection 412 may store the collected metrics (e.g., as dependent variables) at analytics store 406 for each corresponding feature received from content featurization 410.

Metrics collection 412 may provide the collected metrics to correlation analysis 414. Correlation analysis 414 may be configured to convert the success of content into the overall success of each associated feature, or the success of a group of features if they have second and higher order effect relationships. In some embodiments, correlation analysis 414 may determine an overall success of each feature based on a success of each associated piece of content. Correlation analysis 414 may provide the overall success of each feature to hypothesis testing 416. Correlation analysis 414 may store the recommended features at analytics store 406 as new hypothesis.

Hypothesis testing 416 may be configured to determine which new features to test as recommend features. In at least one embodiment hypothesis testing 416 may identify at least one random feature as a recommended feature to inject into the system as an untested feature and/or as a sample feature. Hypothesis testing 416 may store the hypothesis as new recommendations in analytics store 406.

General Operation

Figure 5:
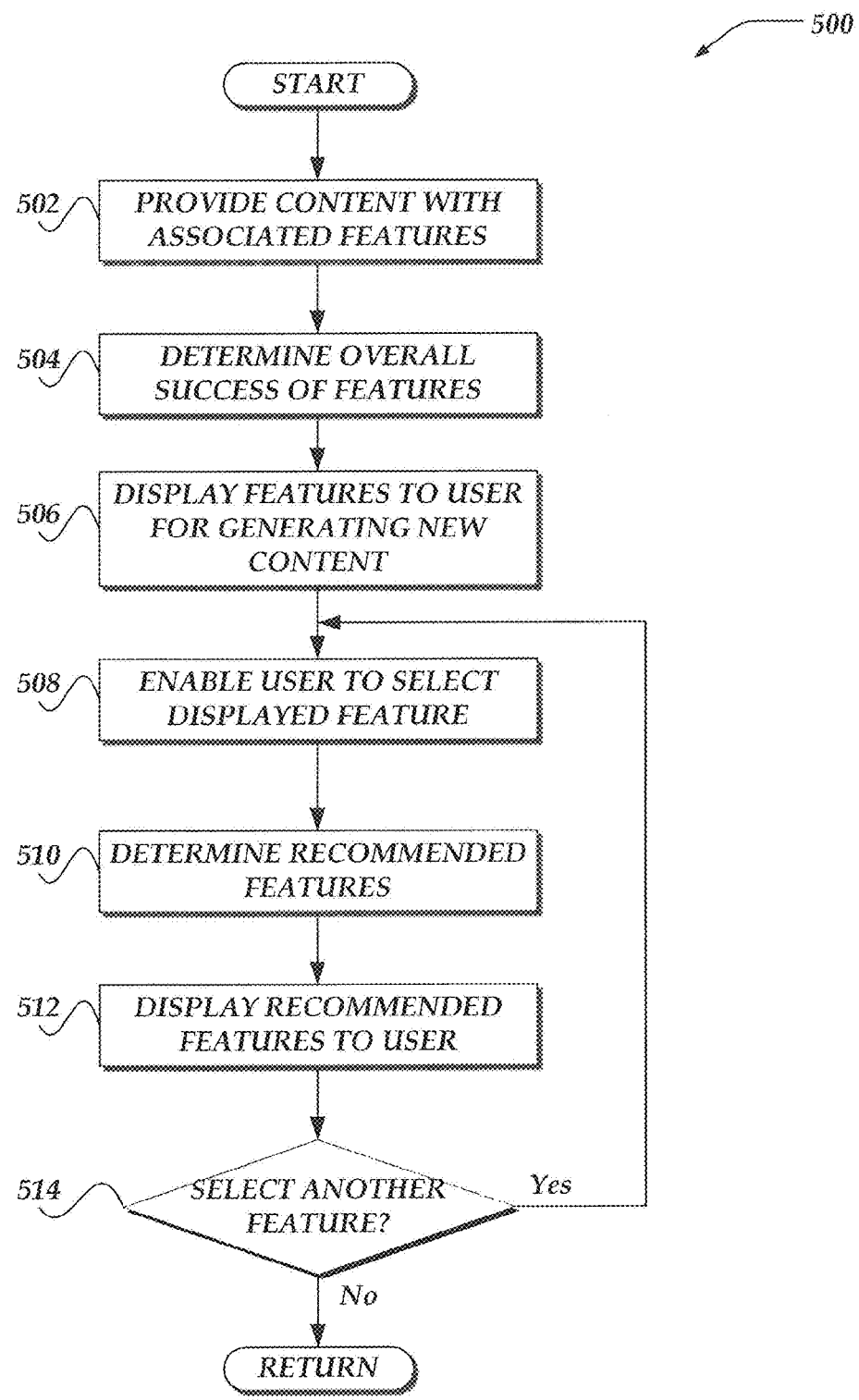
FIG. 5 illustrates a logical flow diagram generally showing one embodiment of an overview process for determining and providing recommended features to a user for a new piece of content.

The operation of certain aspects of the invention will now be described with respect to FIGS. 5-7. FIG. 5 illustrates a logical flow diagram generally showing one embodiment of an overview process for determining and providing recommended features to a user for a new-piece of content. In some embodiments, process 500 of FIG. 5 may be implemented by and/or executed on a single network device, such as network device 300 of FIG. 3. In other embodiments, process 400 or portions of process 500 of FIG. 5 may be implemented by and/or executed on a plurality of network devices, such as network device 300 of FIG. 3.

Process 500 begins, after a start block, at block 502, where a plurality of content may be provided. In some embodiments, the plurality of content may be selected from a plurality of published content—that is, content that was previously provided to a channel. In various embodiments, each piece of content may be associated with one or more features. In at least one embodiment, there may be a plurality of features, where each feature may be associated with multiple pieces of content which may be published and/or previously published by one or more publishers.

Process 500 proceeds to block 504, where an overall success of each feature of the plurality of features for at least one channel may be determined, which is described in more detail below in conjunction with FIG. 6. Briefly, however, the overall success of each feature may be determined at least on each success for each of the plurality of content that is associated with the at least one feature.

Process 500 continues at block 506, where at least one of the plurality of features may be displayed to a user for generating new content. In at least one embodiment, the displayed features may be features that are recommended to the user to use when generating the new content. In one non-limiting, non-exhaustive example, the displayed features may include the features "include picture," "discuss celebrity A", "keep the content under 200 words," or the like.

In some embodiments, a subset of the plurality of features may be displayed to the user, such as, for example, five or ten features. However, embodiments are not so limited and other numbers of features may be displayed to the user. In some embodiments, the features displayed to the user may be randomly selected from the plurality of features. In other embodiments, the features displayed to the user may be selected based on the overall success of the features. In at least one of such embodiment, the displayed features may be a given number of features (e.g., ten features) with a highest overall success. However, embodiments are not so limited and other mechanisms may be employed to determine which features to display to the user. For example, in some embodiments, the displayed features may include new features not previously displayed and/or features with a lowest success (or below a predetermined threshold). By including new features and/or non-successful features, the system may test/explore the new/non-successful features to determine if the success of a feature has changed, which may indicate if the content audience preferences have changed.

In any event, process 500 proceeds next to block 508, where the user may be enabled to select at least one of the displayed features for generating the new content. In at least one embodiment, a graphical user interface (GUI) may be employed to enable the user to select a feature. For example, the GUI may display a list of features, where each displayed feature includes a corresponding selection box. So a user may select a feature by clicking on the corresponding selection box. However, embodiments are not so limited and other GUI selection mechanisms may be employed.

In various embodiments, the new content may be content that is in the process of being created, previously generated, or the like. In one non-limiting, non-exhaustive example, the user may indicate the start of creating a new piece of content, such as, by clicking on a button. In response, the GUI may display features to the user at block 506 and may enable the user to select features at block 508 for the new content.

Process 500 continues next at block 510, where one or more recommended features may be determined for the new content for publishing on the at least one channel. In some embodiments, each recommended features may be determined based on the overall success of each selected feature (at block 508) and the overall success of the corresponding recommended feature. In at least one embodiment, a recommendation for at least one unselected feature may be determined based on the overall success of the at least one selected feature along with the at least one recommended feature for published content on the at least one channel. So in some embodiments, an unselected feature may be recommended to the user based on an overall success of the selected features when combined with the unselected feature for a same piece of previously published content.

In some embodiments, a feature may be recommended to the user if the combined overall success of the selected feature and the unselected feature produces a statistically significant result over the overall success of the currently selected features, is above a predetermined threshold, or the like. In another embodiment, a given number of features with a highest overall success (e.g., overall success of an unselected feature when combined with the selected features) may be recommended to the user.

In some embodiments, the recommended features may include previously displayed feature, different features that were not previously displayed, or some combination thereof. In at least one of various embodiments, if a feature is selected by the user, then it may not be recommended again for that piece of new content.

In some other embodiments, the recommended features may also include new features and/or non-successful features (e.g., a feature with the lowest overall success when that feature is combined with the selected features, or a feature with an overall success less than a predetermined threshold). By providing these features, the system may introduce randomness to explore successes of other features. In some embodiments, a user may be enable to adjust how much exploration is desired (e.g., a minimum or maximum number of non-successful features).

It should be recognized that some recommendations may or may not be selected by a user (e.g., at block 508), which may create a natural test of new combinations of features. Thus, in some embodiments, the overall success of the plurality of features may change over time and may be re-determined by performing process 600 of FIG. 6.

In any event, process 500 proceeds next to block 512, where the recommended features may be displayed to the user. In at least one of various embodiments, the displayed features (e.g., at block 506) may be dynamically updated to include the recommended features.

Process 500 continues at decision block 514, where a determination may be made whether another feature is selected. In at least one embodiment, the user may be enabled to select at least one of the displayed features—including the recommended features—such as described above in conjunction with block 508. If another feature is selected, then process 500 may loop to block 510, where other recommended features may be determined; otherwise, process 500 may return to a calling process to perform other actions.

It should be recognized that each time a user selects a feature (at block 508), the system may determine and display new recommended features (at blocks 510 and 512) from which the user can select.

In some embodiments, the features may be in a hierarchical structure (e.g., relationships to other features), such as a decision tree. This hierarchical structure may enable a user to select an initial feature and the recommended features may be those features that are related to the selected feature. In some embodiments, features may be related if they were both previously associated with a same piece of content. This hierarchical structure of features may enable the user can traverse the hierarchy of features by continually selecting recommended features. For example, the user can select a first feature and a set of recommended features may be displayed (e.g., those features that are related features to the selected feature). The user can then select a second feature from the recommended features and a new set of recommended features may be displayed, and so on.

Figure 6:
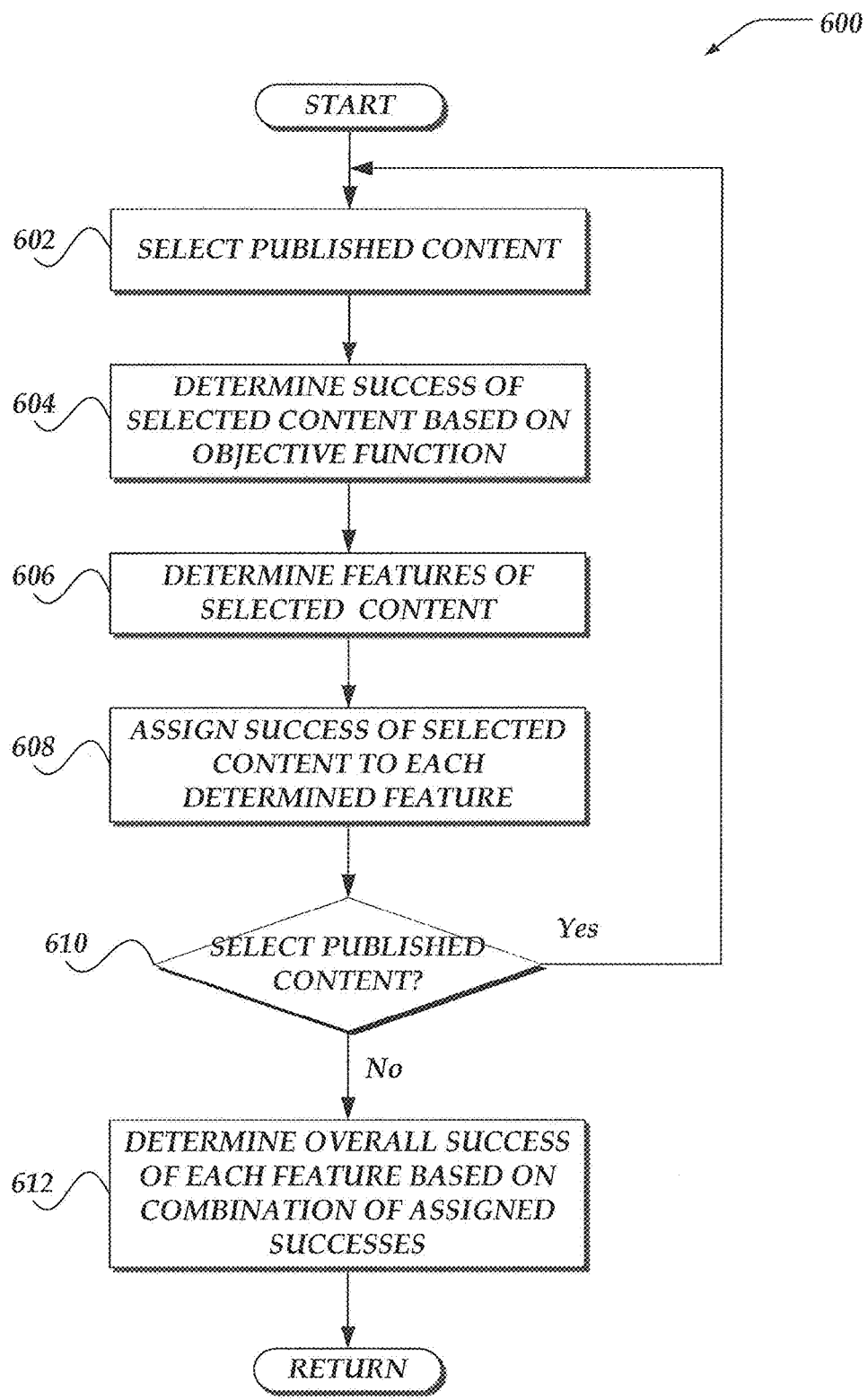
FIG. 6 illustrates a logical (low diagram generally showing one embodiment of a process for determining an overall success fore each of a plurality of features.

FIG. 6 illustrates a logical flow diagram generally showing one embodiment of a process for determining an overall success for each of a plurality of features. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where published content may be selected. In at least one embodiment, the content may be selected from a plurality of content provided at block 502 of FIG. 5. The content may be randomly selected, or selected based on a determined order (e.g., publication date), or the like.

Process 600 proceeds to block 604, where a success of the selected content may be determined. In at least one embodiment, this determination may be based on a predetermined objective function. In at least one embodiment, the success of the selected content may be represented as a value, such that a success of one piece of content can be compared to another piece of content. In some embodiments, this value may be a rate and/or average at which the monitored actions occur. Examples, of such rates, may include a number of clicks per week, a number of times users' share the piece content per week, a number of comments per week, an average time viewing a piece of content, or the like.

In some embodiments, a greater value of success for a piece of content may indicate that that piece of content was more successful than another piece of content with a lower value of success. For example, Content_A may have 88 user clicks over a given period of time and Content_B may have 65 clicks for the same given period of time. Since Content_A has more user clicks, Content_A may be determined to be more successful than Content_B.

In any event, process 600 continues next at block 606, where each feature associated with the selected content may be determined. In at least one embodiment, the associated features may be determined from metadata of the selected content. In other embodiments, a database may maintain a list of features associated with each of the plurality of published content.

Process 600 proceeds next to block 608, where the success of the selected content may be assigned to each of the associated features. In at least one embodiment, the assigned success of a given feature may be stored and/or maintained with the given feature, which may be utilized at block 612 to determine an overall success of the feature. In some embodiments, each of a plurality of features may be assigned a success of each piece of content that it is associated. In some other embodiments, each feature may also include a relationship of the other features associated with the selected feature.

Continuing to decision block 610, a determination may be made whether more published content may be selected. In at least one embodiment, content may continue to be selected until a predetermined threshold number of content are selected. In another embodiment, content may be selected until each of a plurality of content is selected. If more published content may be selected, then process 600 may loop to block 602; otherwise, process 600 may flow to block 612.

At block 612, an overall success of each feature may be determined based on a combination of the assigned successes for a corresponding feature. In one embodiment, the overall success of a given feature may be an average of the assigned success for that feature. So, in some embodiments, the overall success of a given feature may be an average success of each piece of content that the given feature is associated with. In other embodiments, combination of assigned successes may include, but is not limited to, a maximum assigned success, a minimum assigned success, or the like. However, embodiments are not so limited and other statistical methods may be employed to determine the overall success of each feature.

An example of determining an overall success of each of a plurality of features is illustrated in Tables 1-4. Table 1 illustrates a plurality of content—Content_1, Content_2, and Content_3—that each has a corresponding success and one or more associated features.

TABLE 1

Plurality of Content and Associated Features

| Content | Success of Content | Associated Features |
|---------|--------------------|--------------------|
| Content_1 | Success_1 | Feature_A |
|  |  | Feature_B |
| Content_2 | Success_2 | Feature_A |
|  |  | Feature_C |
| Content_3 | Success_3 | Feature_A |
|  |  | Feature_B |
|  |  | Feature_D |

Table 1 may be converted to illustrate the plurality of features and their corresponding assigned successes, which is illustrated in Table 2.

TABLE 2

Plurality of Features and Assigned Success

| Feature | Associated Content | Assigned Success |
|---------|--------------------|-----------------|
| Feature_A | Content_1 | Success_1 |
|  | Content_2 | Success_2 |
|  | Content_3 | Success_3 |
| Feature_B | Content_1 | Success_1 |
|  | Content_3 | Success_3 |
| Feature_C | Content_2 | Success_2 |
| Feature_D | Content_3 | Success_3 |

The assigned successes for each feature may then be combined to determine an overall success of each feature, as illustrated by Table 3.

TABLE 3

Plurality of Features and Corresponding Overall Success

| Feature | Overall Success |
|---------|-----------------|
| Feature_A | Combination of Success_1, Success_2, and Success_3 |
| Feature_B | Combination of Success_1 and Success_3 |
| Feature_C | Success_2 |
| Feature_D | Success_3 |

In some embodiments, each feature may include a plurality of success metrics, where each success metric may be an overall success of the feature when that feature is accompanied by another feature for a same piece of content. In at least one such embodiment, each feature may include relationship with other features and a corresponding overall success for each relationship. Continuing the example illustrated in Tables 1-3, Table 4 illustrates the overall success of Feature_A alone and successes of corresponding feature relationships.

TABLE 4

Plurality of Overall Success for Feature A

| Feature Relationships | Overall Success |
|---|---|
| Feature__A | Combination of Success__1, Success__2, and Success__3 |
| Feature__A with Feature__B | Success__1 |
| Feature__A with Feature__C | Success__2 |
| Feature__A with Feature__D | Success__3 |
| Feature__A with Feature__B and Feature__D | Success__3 |

After block 612, process 600 may return to a calling process to perform other actions.

In some embodiments, process 600 may be employed for a plurality of different channels and/or a plurality of different sets of channels. So, in some embodiments, each feature may include a different overall success for each different channel and/or set of channels. Also, over time an overall success of some features may change. So, in some embodiments, process 600 may be manually and/or automatically re-executed to select a new set of content to re-determine and/or recalculate the overall success of the plurality of features.

Figure 7:
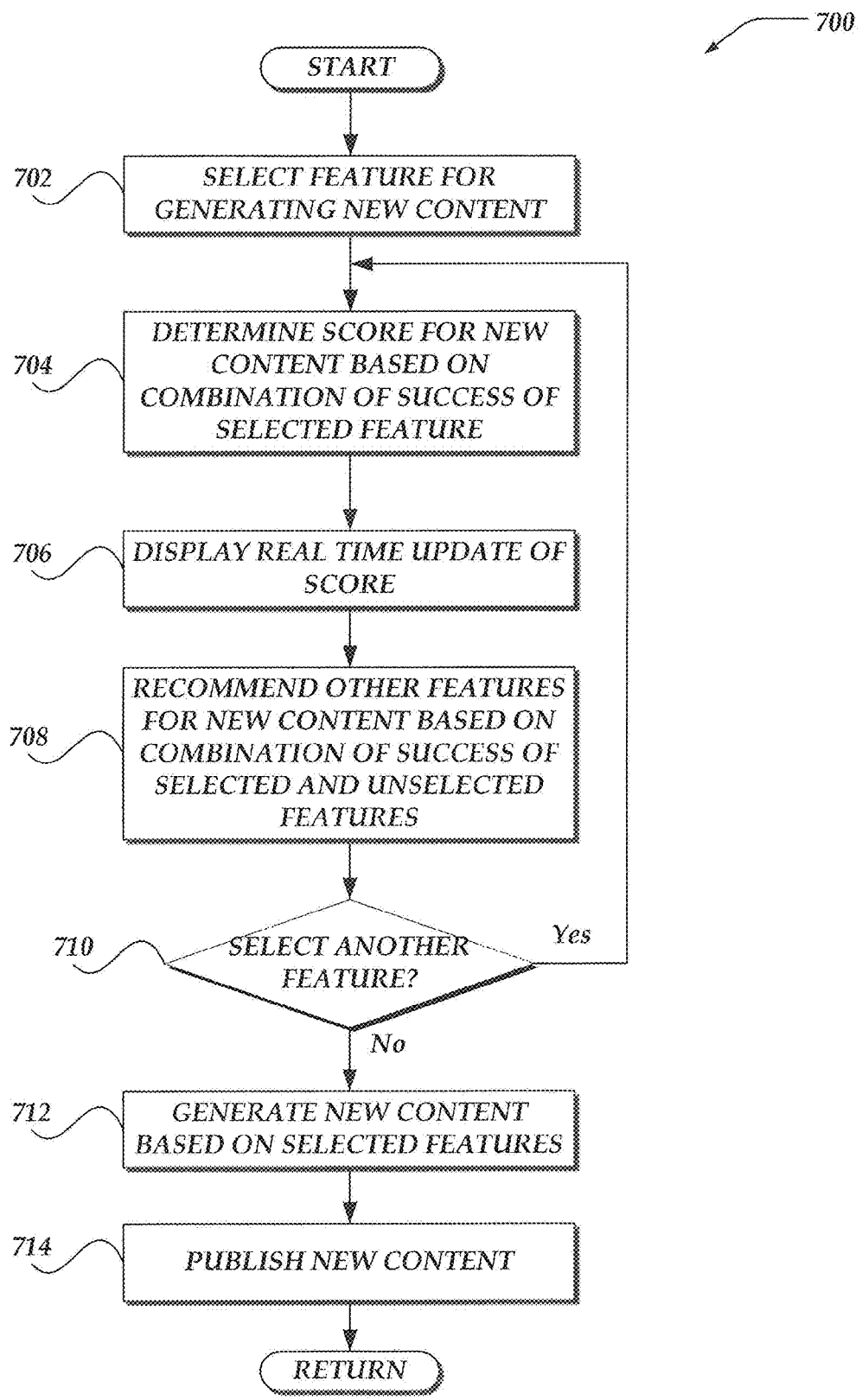
FIG. 7 illustrates a logical flow diagram generally showing one embodiment of a process for dynamically displaying features to a user.

FIG. 7 illustrates a logical flow diagram generally showing one embodiment of a process for dynamically displaying features to a user. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, where a feature may be selected. In at least one of various embodiments, a user may be enabled to select a feature for generating new content for at least one channel from a plurality of displayed features, such as is described at blocks 506 and 508 of FIG. 5.

Process 700 proceeds to block 704, where a score for the new content may be determined. In at least one embodiment, the score may be calculated based on a combination of overall successes of the selected features. In some embodiments, the combination may be based on the relationship of the selected features. In at least one embodiment, the score of the new content may be determined based on the overall success of the at least one selected feature a combination along with each other for published content on the at least one channel. In some embodiments, the score may be based on a conditional probability of the selected features being successful when used together for a piece of content based on previously published content that was associated with the same selected features.

Process 700 continues at block 706, where the score may be displayed to the user in real time. In at least one embodiment, a GUI may update the score as the user selects additional features.

Process 700 proceeds next to block 708, where one or more other features may be recommended to the user for the new content for the at least one channel. In at least one of various embodiments, block 708 may employ embodiments of blocks 510 and 512 of FIG. 5 to determine and displayed recommended features. In some embodiments, a feature may be determined to be a recommended feature based on an overall success of the selected features and an overall success of at least one unselected feature. In at least one embodiment, a feature may be recommended to the user if it may in combination with the selected features have a statistically significant impact on the success of the new content based on a success of previously published content that was associated with the same selected and recommended features.

In any event, process 700 continues next at decision block 710, where a determination may be made whether another feature is selected for generating the new content. In at least one embodiment, decision block 710 may be an embodiment of decision block 514 of FIG. 5. If another feature is selected, process 700 may loop to block 704; otherwise, process 700 may flow to block 712.

At block 712, the selected features may be employed to generate and/or create the new content for the at least one channel. In some embodiments, the new content may be a previously generated content, in which case the content may be updated and/or modified based on the selected features. In other embodiments, the user may be enabled to create the new content based on the selected features. For example, if the selected features include "discuss Celebrity A," "discuss Celebrity B," and "keep content under 200 words", then the user may be able to create the new content and include comments about Celebrity A and Celebrity B, while maintaining a word count of less than 200 words.

Process 700 proceeds next to block 714, where the new content may be published. In at least one embodiment, the new content may be provided to one or more channels. In some embodiments, the channel may be determined based on a selected feature.

After block 714, process 700 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Embodiments

As described above, some embodiments may include determining an overall success of a plurality of features for different channels. Table 5 illustrates an example of an overall success of a plurality of features for a plurality of different channels. As illustrated there are three channels: Show A, Show B, and Show C. The associated features may include different content types, such as, "gallery," "article," and "video."

TABLE 5

Analysis by Content Type

| | Pieces of Content Produced | Average Visits per Piece of Content |
|---|---|---|
| Show A | | |
| Gallery | 9 | 89 |
| Article | 96 | 76 |
| Video | 59 | 73 |
| Show B | | |
| Article | 106 | 156 |
| Gallery | 20 | 116 |
| Video | 6 | 27 |
| Show C | | |
| Video | 17 | 264 |
| Gallery | 8 | 221 |
| Article | 109 | 199 |

In this example, assuming the cost of producing a single gallery, article, or video is the same, the system may recommend that a gallery (i.e., a recommended feature) be generated for Show A, but an article for Show B, and a video for Show C. In at least one embodiment, the publishing process may be optimized to generate more photo galleries for Show A (and fewer articles); plus, more articles for Show B (and fewer photo galleries). This may enable the publisher to accumulate more average visits per piece of content for each given show. In some embodiments, these findings can be confirmed for their statistical significance by using a controlled experiment and a t-test.

Table 6 illustrates another example of an overall success of a plurality of features for a plurality of different channels. As illustrated there are three channels: Show A, Show B, and Show C. The associated features may include different authors, such as, "J.M.," "M.F.," "K.H.," "R.M.," and "M.B.,"

TABLE 2

Analysis by Author

| | Pieces of Content Produced | Average Visits per Piece of Content |
|---|---|---|
| Show A | | |
| J. M. | 15 | 88 |
| M. F. | 88 | 82 |
| K. H. | 61 | 60 |
| Show B | | |
| M. F. | 34 | 230 |
| R. M. | 58 | 117 |
| M. B. | 18 | 104 |
| J. M. | 22 | 94 |
| Show C | | |
| M. B. | 50 | 220 |
| R. M. | 81 | 200 |

In this example, author J.M. may achieve a higher-than-average result (i.e., a higher overall success) in Show A than the other authors. However, J.M. may produce more content for Show B rather than Show A, but with a lower overall success than other authors. By employing embodiments described above, the system may recommend the feature of author J.M. for a piece of content for Show A, which may enable the reallocation of resources such that J.M. creates content for Show A more frequently than Show B.

Figure 8:
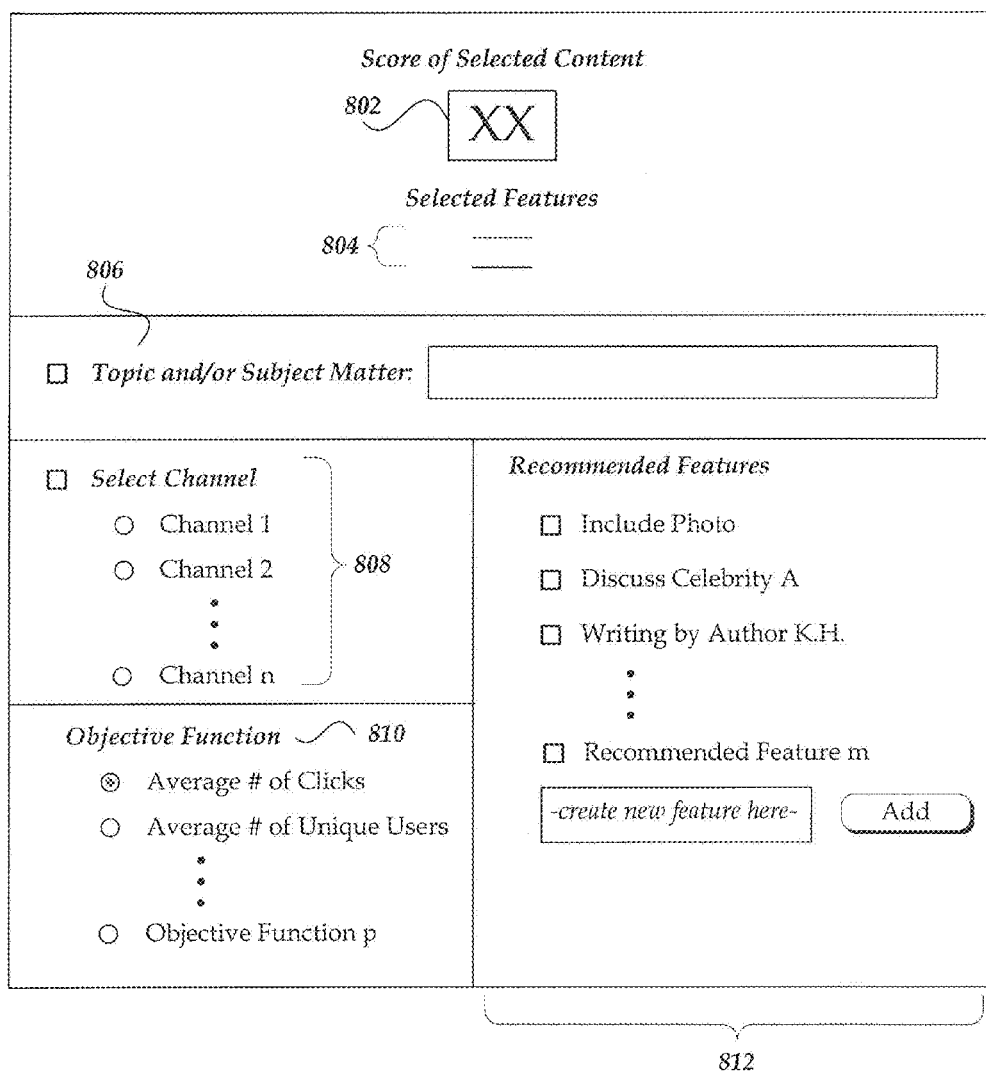
FIG. 8 shows a use case illustration of an embodiment of a graphical user interface that may be employed to dynamically display features to a user and enable the user to select features.

FIG. 8 shows a use case illustration of an embodiment of a graphical user interface that may be employed to dynamically display features to a user and enable the user to select features. Interface 800 may enable a user to select which features to include when creating content. Interface 800 may include score 802, selected features 804 topic 806, channels 808, objective functions 810, and recommended features 812.

Score 802 may display a score that is calculated based on selected features 804. In at least one embodiment score 802 may be calculated by employing embodiments of block 704 of FIG. 7. Selected features 804 may include those features that have been selected by the user from recommended features 812. Recommended features 812 may include one or more features that are recommended that the user selects. In some embodiments, recommended features 812 may include features that are recommended based on selected features 804. If a user selects a feature from recommended features 812, then selected features 804 may be updated to display the selected feature and recommended features 812 may be dynamically updated in include new and/or other recommended features. In some embodiments, the user may be enabled to create additional features that are not displayed in recommended features 812. Once created, the new feature may be displayed in selected features 804.

Topic 806 may enable a user to input a topic and/or subject matter of the new content. In some embodiments, topic 806 may not be selected, but rather a feature from recommended features 812 may be selected as the topic the new content.

Channels 808 may enable the user to select a channel for providing the new the new content. In some embodiments, channel 808 may not be selected, but rather a feature from recommended features 812 may be selected as the channel for providing the new content.

Objective function 830 may enable the user to select which objective function to utilize to recommend features (e.g., to apply to determine an overall success of each feature) and to generate score 802.

Figure 9:
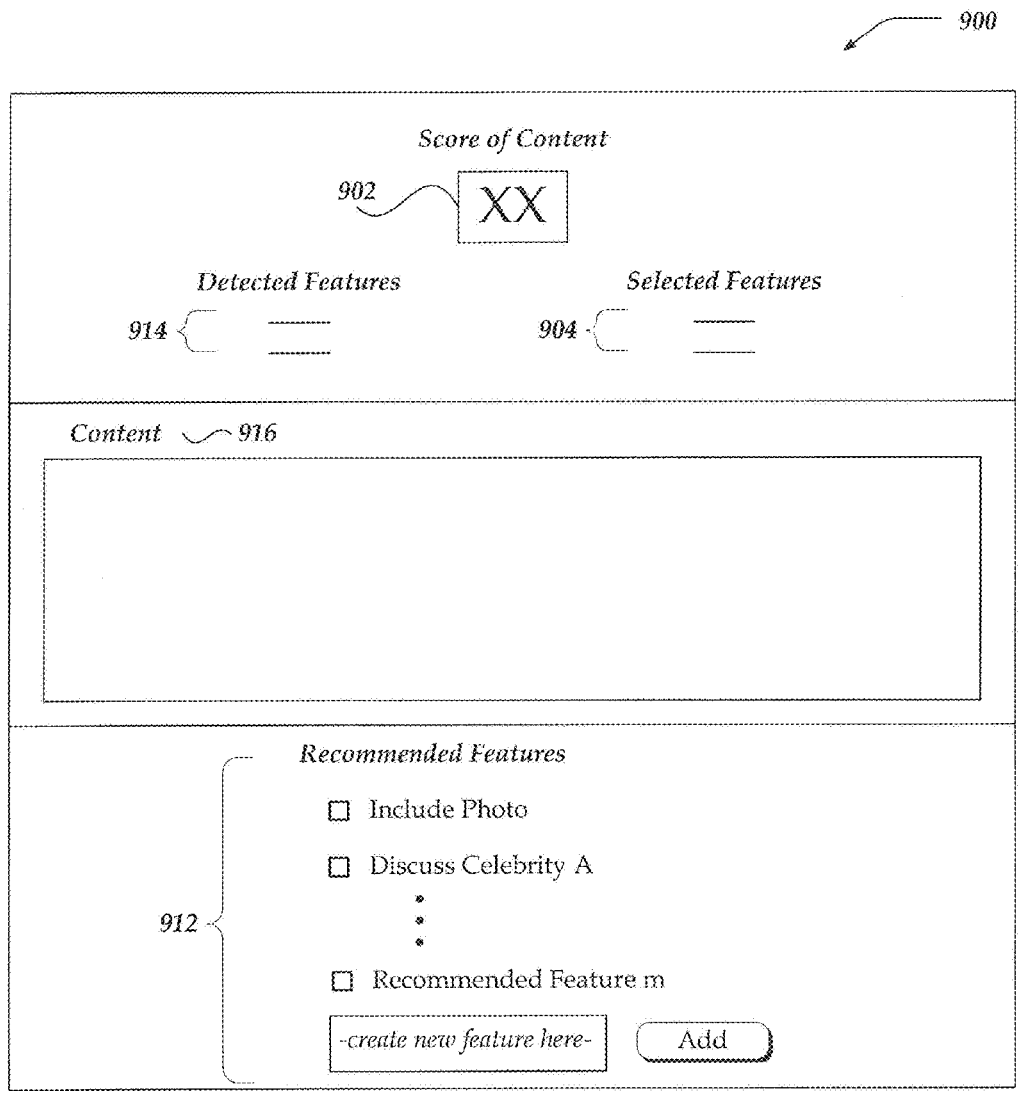
FIG. 9 shows a use case illustration of an alternative embodiment of a graphical user interface that may be employed to dynamically display features to a user and enable the user to select features.

FIG. 9 shows a use case illustration of an alternative embodiment of a graphical user interface that may be employed to dynamically display features to a user and enable the user to select features. Interface 900 may enable a user to select which features to include when creating content. In at least one embodiment interface 900 may include a blog or other content generation website. Interface 900 may include score 902, selected features 904, detected features 914, content 916, and recommended features 912.

In some embodiments, score 902 may be an embodiment of score 802 of FIG. 8. Score 902 may display a score that is calculated based on selected features 904 and detected features 914. Selected features 904 may be an embodiment of selected features 804 of FIG. 8.

Detected features 914 may include those features that are automatically detected from content 916. In at least one embodiment, at least one detected feature may be determined from the new content (content 916). As a user provides content 916, the system may detect and display features (e.g., features associated with previously published content) included in content 916. For example, if the user adds text that discusses Celebrity A, then detected features 914 may be updated to include detected feature "discuss Celebrity A", which may adjust score 902.

Recommended features 912 may be an embodiment of recommended features 812 of FIG. 8. In some embodiments, some features may not be automatically detect, which the user may want add. The user may create and add these features through an input mechanism, such as a text box. However, embodiments are not so limited. In some embodiments, the at least one recommended feature may be determined based on the overall success of the at least one selected feature (selected features 904) and the at least one detected feature (detected features 914) along with the at least one recommended feature for published content on the at least one channel.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing content over a network, wherein at least one network device performs actions, comprising:
   determining an overall success for at least one of a plurality of features for a plurality of content that is published on at least one of a plurality of channels, wherein the overall success of each of the at least one feature is based at least on each success for each of the plurality of content that is associated with the at least one feature;
   displaying two or more of the plurality of features to a user, wherein the user is enabled to select at least one feature, wherein one or more relationships between the plurality of features is hierarchically arranged in a decision tree;
   determining a combined overall success for each combination of the at least one selected feature and each unselected feature of the plurality of features, wherein each combined overall success is based on when the at least one selected feature is used in combination with an unselected feature for at least one same piece of content that was previously published on the at least one channel;
   determining at least one unselected feature of the plurality of features to recommend as at least one recommended feature based on the determined combined overall success of the at least one recommended feature combined with the at least one selected feature having a statistically significant result that is above a predetermined threshold over the overall success of the at least one selected feature without the at least one recommended feature and the hierarchical relationship between the at least one unselected feature and the at least one recommended feature in the decision tree;
   updating the displaying of features to the user to include at least one of one or more recommended features based at least on the determination of the at least one unselected feature, one or more new features, or one or more non-successful features, wherein the user is enabled to select one or more of the displayed features;
   determining a score of the new content based on the overall success of the at least one selected feature in combination along with each other for published content on the at least one channel;
   displaying real time updates of the score to the user; and
   enabling the user to employ each selected feature to generate new content for publication on the at least one of the plurality of channels.

2. The method of claim 1, further comprising:
   publishing the new content to at least one of the at least one of the plurality of channels.

3. The method of claim 1, wherein determining the overall success of each of the plurality of features, further comprises:
   for each content of the plurality of content;
      determining the success of the content based on a predetermined objective function;
      determining each feature that is associated with the content; and
      assigning the success of the content to each determined feature as the overall feature of the determined feature.

4. The method of claim 1, wherein updating the display of features, further comprises:
   dynamically updating the display of the features to the user in real time to include other recommended features as the user selects additional features.

5. The method of claim 1, wherein determining the at least one recommended feature, further comprises:
   determining at least one detected feature from the new content; and
   determining the at least one recommended feature based on the overall success of the at least one selected feature and the at least one detected feature along with the at least one recommended feature for published content on the at least one channel.

6. The method of claim 1, wherein another overall success of each of the plurality of features is determined for another at least one of the plurality of channels.

7. A system for managing content over a network, comprising:
   at least one network device, comprising:
      a memory or storing data and instructions;
      a processor that executes the instructions to enable actions, comprising:
         determining an overall success for at least one of a plurality of features for a plurality of content that is published on at least one of a plurality of channels, wherein the overall success of each of the at least one feature is based at least on each success for each of the plurality of content that is associated with the at least one feature;
      displaying two or more of the plurality of features to a user, wherein the user is enabled to select at least one feature, wherein one or more relationships between the plurality of features is hierarchically arranged in a decision tree;
      determining a combined overall success for each combination of the at least one selected feature and each unselected feature of the plurality of features, wherein each combined overall success is based on when the at least one selected feature is used in combination with an unselected feature for at least one same piece of content that was previously published on the at least one channel;
      determining at least one unselected feature of the plurality of features to recommend as at least one recommended feature based on the determined combined overall success of the at least one recommended feature combined with the at least one selected feature having a statistically significant result that is above a predetermined threshold over the overall success of the at least one selected feature without the at least one recommended feature and the hierarchical relationship between the at least one unselected feature and the at least one recommended feature in the decision tree;
      updating the displaying of features to the user to include at least one of one or more recommended features based at least on the determination of the at least one unselected feature, one or more new features, or one or more non-successful features, wherein the user is enabled to select one or more of the displayed features;

determining a score of the new content based on the overall success of the at least one selected feature in combination along with each other for published content on the at least one channel;

displaying real time updates of the score to the user; and enabling the user to employ each selected feature to generate new content for publication on the at least one of the plurality of channels.

8. The system of claim 7, wherein the processor enables further actions, comprising:
publishing the new content to at least one of the at least one of the plurality of channels.

9. The system of claim 7, wherein determining the overall success of each of the plurality of features, further comprises:
for each content of the plurality of content;
determining the success of the content based on a predetermined objective function;
determining each feature that is associated with the content; and
assigning the success of the content to each determined feature as the overall feature of the determined feature.

10. The system of claim 7, wherein updating the display of features, further comprises:
dynamically updating the display of the features to the user in real time to include other recommended features as the user selects additional features.

11. The system of claim 7, wherein determining the at least one recommended feature, further comprises:
determining at least one detected feature from the new content; and
determining the at least one recommended feature based on the overall success of the at least one selected feature and the at least one detected feature along with the at least one recommended feature for published content on the at least one channel.

12. The system of claim 7, wherein another overall success of each of the plurality of features is determined for another at least one of the plurality of channels.

13. A processor readable non-transitory storage media that includes instructions for managing content over a network, wherein the execution of the instructions by a processor enables actions, comprising:
determining an overall success for at least one of a plurality of features for a plurality of content that is published on at least one of a plurality of channels, wherein the overall success of each of the at least one feature is based at least on each success for each of the plurality of content that is associated with the at least one feature;
displaying two or more of the plurality of features to a user, wherein the user is enabled to select at least one feature, wherein one or more relationships between the plurality of features is hierarchically arranged in a decision tree;
determining a combined overall success for each combination of the at least one selected feature and each unselected feature of the plurality of features, wherein each combined overall success is based on when the at least one selected feature is used in combination with an unselected feature for at least one same piece of content that was previously published on the at least one channel;
determining at least one unselected feature of the plurality of features to recommend as at least one recommended feature based on the determined combined overall success of the at least one recommended feature combined with the at least one selected feature having a statistically significant result that is above a predetermined threshold over the overall success of the at least one selected feature without the at least one recommended feature and the hierarchical relationship between the at least one unselected feature and the at least one recommended feature in the decision tree;

updating the displaying of features to the user to include at least one of one or more recommended features based at least on the determination of the at least one unselected feature, one or more new features, or one or more non-successful features, wherein the user is enabled to select one or more of the displayed features;

determining a score of the new content based on the overall success of the at least one selected feature in combination along with each other for published content on the at least one channel;

displaying real time updates of the score to the user; and enabling the user to employ each selected feature to generate new content for publication on the at least one of the plurality of channels.

14. The media of claim 13, further comprising:
publishing the new content to at least one of the at least one of the plurality of channels.

15. The media of claim 13, wherein determining the overall success of each of the plurality of features, further comprises:
for each content of the plurality of content;
determining the success of the content based on a predetermined objective function;
determining each feature that is associated with the content; and
assigning the success of the content to each determined feature as the overall feature of the determined feature.

16. The media of claim 13, wherein updating the display of features, further comprises:
dynamically updating the display of the features to the user in real time to include other recommended features as the user selects additional features.

17. The media of claim 13, wherein determining the at least one recommended feature, further comprises:
determining at least one detected feature from the new content; and
determining the at least one recommended feature based on the overall success of the at least one selected feature and the at least one detected feature along with the at least one recommended feature for published content on the at least one channel.

18. The media of claim 13, wherein another overall success of each of the plurality of features is determined for another at least one of the plurality of channels.

19. A computing device for managing content over a network, comprising:
a memory for storing data and instructions; and
a processor that executes the instructions to enable actions, including:
determining an overall success for at least one of a plurality of features for a plurality of content that is published on at least one of a plurality of channels, wherein the overall success of each of the at least one feature is based at least on each success for each of the plurality of content that is associated with the at least one feature;
displaying two or more of the plurality of features to a user, wherein the user is enabled to select at least one feature, wherein one or more relationships between the plurality of features is hierarchically arranged in a decision tree;

determining a combined overall success for each combination of the at least one selected feature and each unselected feature of the plurality of features, wherein each combined overall success is based on when the at least one selected feature is used in combination with an unselected feature for at least one same piece of content that was previously published on the at least one channel;

determining at least one unselected feature of the plurality of features to recommend as at least one recommended feature based on the determined combined overall success of the at least one recommended feature combined with the at least one selected feature having a statistically significant result that is above a predetermined threshold over the overall success of the at least one selected feature without the at least one recommended feature and the hierarchical relationship between the at least one unselected feature and the at least one recommended feature in the decision tree;

updating the displaying of features to the user to include at least one of one or more recommended features based at least on the determination of the at least one unselected feature, one or more new features, or one or more non-successful features, wherein the user is enabled to select one or more of the displayed features;

determining a score of the new content based on the overall success of the at least one selected feature in combination along with each other for published content on the at least one channel;

displaying real time updates of the score to the user; and enabling the user to employ each selected feature to generate new content for publication on the at least one of the plurality of channels.

20. The computing device of claim 19, further comprising: publishing the new content to at least one of the at least one of the plurality of channels.

21. The computing device of claim 19, wherein determining the overall success of each of the plurality of features, further comprises:

for each content of the plurality of content;
   determining the success of the content based on a predetermined objective function;
   determining each feature that is associated with the content; and
   assigning the success of the content to each determined feature as the overall feature of the determined feature.

22. The computing device of claim 19, wherein updating the display of features, further comprises:
   dynamically updating the display of the features to the user in real time to include other recommended features as the user selects additional features.

23. The computing device of claim 19, wherein determining the at least one recommended feature, further comprises:
   determining at least one detected feature from the new content; and
   determining the at least one recommended feature based on the overall success of the at least one selected feature and the at least one detected feature along with the at least one recommended feature for published content on the at least one channel.

24. The computing device of claim 19, wherein another overall success of each of the plurality of features is determined for another at least one of the plurality of channels.

* * * * *